(12) United States Patent
Cooney et al.

(10) Patent No.: US 10,688,541 B2
(45) Date of Patent: Jun. 23, 2020

(54) PORTABLE SHELLFISH BASKET WASHER

(71) Applicant: Morgan State University, Baltimore, MD (US)

(72) Inventors: Ted Cooney, Fishing Creek, MD (US); Donghee Kang, Timonium, MD (US)

(73) Assignees: MORGAN STATE UNIVERSITY, Baltimore, MD (US); CHESAPEAKE ISLAND OYSTERS, LLC, Trappe, MD (US)

( * ) Notice: Subject to any disclaimer, the term of this patent is extended or adjusted under 35 U.S.C. 154(b) by 69 days.

(21) Appl. No.: 16/000,974

(22) Filed: Jun. 6, 2018

(65) Prior Publication Data

US 2018/0345335 A1    Dec. 6, 2018

Related U.S. Application Data

(60) Provisional application No. 62/515,830, filed on Jun. 6, 2017.

(51) Int. Cl.
| | |
|---|---|
| *B08B 9/093* | (2006.01) |
| *B08B 3/02* | (2006.01) |
| *B08B 3/04* | (2006.01) |
| *A01K 61/55* | (2017.01) |

(52) U.S. Cl.
CPC ............. *B08B 9/093* (2013.01); *A01K 61/55* (2017.01); *B08B 3/02* (2013.01); *B08B 3/024* (2013.01); *B08B 3/026* (2013.01); *B08B 3/041* (2013.01); *B08B 2203/0223* (2013.01); *B08B 2203/0258* (2013.01)

(58) Field of Classification Search
CPC .......... A01K 61/55; B08B 3/02; B08B 3/024; B08B 9/093
See application file for complete search history.

(56) References Cited

U.S. PATENT DOCUMENTS

| | | | | |
|---|---|---|---|---|
| 5,220,933 | A * | 6/1993 | Albers | B05B 13/0285 134/58 R |
| 5,482,064 | A * | 1/1996 | Goddard | B08B 3/006 134/112 |
| 9,675,910 | B1 * | 6/2017 | Wade | B01D 29/0077 |
| 2002/0166578 | A1 * | 11/2002 | Leblond | A46B 13/001 134/99.2 |
| 2006/0243309 | A1 * | 11/2006 | Prescott | B01D 41/04 134/33 |
| 2018/0369841 | A1 * | 12/2018 | Fairchild | B05B 9/002 |

* cited by examiner

*Primary Examiner* — Spencer E Bell
(74) *Attorney, Agent, or Firm* — Whiteford, Taylor & Preston, LLP; Peter J. Davis

(57) ABSTRACT

A shellfish basket washing apparatus configured to hang over the side rail of an oyster harvester or other boat having a support assembly arranged to straddle and be supported on said side rail, a basket holder and a high pressure nozzle assembly connected to a water side of said support assembly, and a working platform, including a pressure washer pump and a water tank, connected to an onboard side of said support assembly.

11 Claims, 7 Drawing Sheets

PORTABLE SHELLFISH BASKET WASHER

BACKGROUND OF THE INVENTION

Field of the Invention

The present invention relates to the cleaning of portable shellfish baskets.

DESCRIPTION OF THE BACKGROUND

A thriving and growing oyster population is critical for water quality, shoreline protection, sediment stabilization, nutrient cycling and sequestration, and providing habitats for other organisms. Individual oysters filter 4 to 34 liters of water per hour, removing phytoplankton, sediments, pollutants, and microorganisms from the water column. Based on an oyster's filtration capability, historic oyster populations of the Chesapeake Bay could filter excess nutrients from the estuary's entire water volume every three to four days. Today that would take nearly a year (Voltey et al., 2008), as native oyster populations in the Chesapeake Bay are at less than 1 percent of historic levels due to two protozoan diseases, overharvesting, and pollution (Newell, 1988). The decline of the Chesapeake Bay region's oyster resources has led to the decline in the quality of the water, shoreline, nutrients and habitats.

Currently, a popular and ecologically friendly method of oyster cultivation is the use of shellfish racks or cages, see, e.g., FIG. 1. According to this method, the oyster spat is placed in a cage and placed in an oyster farming area of the bay. After approximately 18 months, the oysters are ready to be harvested. When the farmer pulls up the baskets to harvest the oysters, the baskets have accumulated grime, mineral deposits, barnacles and other contaminants and therefore need to be cleaned prior to the next growing cycle. As of this writing, the most common way to clean the shellfish baskets is to use a standard pressure washer device directing a single hand-held nozzle at one or more baskets sitting on the ground or on the deck of a boat, with the user/oyster farmer walking around the baskets during the spraying operation or turning the baskets manually as necessary to allow the high pressure spray to reach all sides of the basket(s), a very time consuming and labor-intensive process.

SUMMARY OF THE INVENTION

The present invention is a portable shellfish basket washer system that can be used on an oyster harvester or other boat, or on a dock or on land, and which significantly reduces the time and effort for cleaning and restoring shellfish/oyster baskets between growing cycles.

According to an embodiment of the invention, the portable basket washer includes an open basket holder configured to rotatably support a shellfish basket therein, an adjustable support assembly for hanging the basket holder over the side of a boat, or off the railing of a dock, wall, fence, or other support structure, an assembly/array of pressure washer nozzles aimed at the shellfish basket through the open sides, top, and bottom of the basket holder, and a pressure washer pump for providing high pressure water to the pressure washer nozzles via high pressure water supply lines (tubes and/or hoses). The bottom of the basket holder is preferably open to allow the washing water to drain directly from basket/basket holder. The pressure washer nozzles may be fixed in position on the nozzle assembly, or the angle at which they are aimed at the basket may be manually or automatically adjustable, individually or separately. According to one embodiment, a small motor causes the basket to rotate in the basket holder as the high pressure spray is directed at the basket through the open sides of the basket holder. According to another embodiment, a water wheel is rotatably fixed in the basket holder, but fixedly attached to a rotatable support spindle, and a high pressure spray nozzle is directed at the water wheel to cause the spindle to turn, in turn causing the basket to rotate within the basket holder as other spray nozzles are directed at the basket for cleaning. According to a preferred embodiment, the high pressure spray nozzles are directed at an angle to the basket such that the high pressure spray itself causes the basket to rotate in the basket holder as it is being sprayed. According to an optional feature of this embodiment, the bottom support spindle may extend down a distance from the bottom of the basket holder sufficient to reach the body of water below, the spindle having a water wheel fixed at its distal end. In this fashion, while the high pressure spray nozzles are causing the basket to spin as it is being cleaned, the water wheel, submerged just below the surface of the body of water, acts as a brake to prevent the basket from spinning too quickly.

According to a preferred embodiment of the invention, the basket holder may have a lid, pivotally attached to the body of the basket holder, and a portion of the lid may interact with a button or sensor in the closed position that will allow the system to operate and/or automatically cause the system to begin spraying.

According to another embodiment of the invention, the basket holder may be pivotally attached to the support assembly allowing the bottom of the basket holder to be rotated away from the side of the boat/dock/other support. According to a preferred feature of this embodiment, the support assembly may be fitted with one or more position plates having a series of holes arranged along one edge to receive a bolt or other rod-type element for fixing the basket holder at one of several angles relative to vertical or to the side of the boat/dock/other support. According to further embodiments of the invention, there may be provided an on-board water tank for supplying water to the pressure washer pump. According to still further embodiments, there may be a water pump for taking water from the body of water in which the boat sits, or adjacent to the dock on which the system is mounted, and for filling the water tank. According to this embodiment, there may be a water intake tube placed in the body of water for the water pump which is preferably fitted with a water filter. According to preferred embodiments of the invention, there may be provided a working platform attached to and optionally hanging from the support assembly on an opposite side from said basket holder. According to such embodiments, the water tank, water pump and/or pressure washer pump may resting upon and/or attached to the working platform, leaving enough room free for an operator to also stand on the platform to operate the system of the invention. When not in operation, the basket holder may be rotated or pivoted onto the working platform for more compact transport and storage. According to a most preferred embodiment, the working platform may be provided with castors or other wheeled arrangement to facilitate movement and transport between uses.

According to still further embodiments of the invention, there may be provided an optional hand-held pressure washer wand and nozzle attached to the pressure washer pump via high pressure supply lines so that the user can spot treat certain parts of the shellfish basket if desired.

In use, an empty shellfish basket is placed into the basket holder through the large opening at the top, the lid is closed, and the spray nozzles spray the basket as it spins. The spinning may be driven by a water wheel, by a drive motor, or by action of the water itself against the basket at an angle. The rotation speed of the basket spinning may be varied by the user using a control panel, depending on the conditions of the basket. The water pressure in the high pressure supply tubing may be used to drive the nozzles or nozzle assembly up and down relative to the basket holder to cover more area as the basket spins. According to an alternative embodiment, the movement of the nozzle array may be driven by a nozzle assembly drive motor or other power means.

When the oyster harvesting process begins (or before), the system of the invention is placed adjacent to the outside rail of the boat (or dock railing, etc.), and the basket holder is rotated or pivoted off the working platform and over the edge of the rail, so as to hang over the water supported by the support assembly. This allows spent water and debris to flow into the waterway. The connections/mountings between the support assembly and the basket holder, and the working platform are adjustable to accommodate different boat/rail widths, heights and types. The angle of the basket holder to the side of the boat/dock may be adjusted based on the surface water level to avoid the washing system from contacting the water below during use. A quick connection system may be provided at the pressure water pump side of the high pressure delivery system to allow for use of a boat's own high pressure pump.

According to a preferred embodiment, the basket cleaning system of the invention will clean a basket within 30 to 60 seconds. A controller can be used to automatically control wash time. The controller may have pre-set wash times at 10 second intervals, e.g., 30 second, 40 second, 50 second and 60 second wash times, or it may be adjusted to provide any wash time. The basket holder may be easily swapped out of the support assembly to allow for use of basket holders of different sizes to accommodate baskets of different sizes and shapes.

The diagrams provided below are illustrative only and are not to limit the scope of the present invention. Specifically, one or more nozzles may be used, they may be used on more than one side of the unit, and the type of nozzle may vary, so as to impart the optimal cleaning efficiency and effectiveness. The number of nozzles will also determine the time needed and number of passes for through washing.

DETAILED DESCRIPTION OF THE INVENTION

Figure 1:
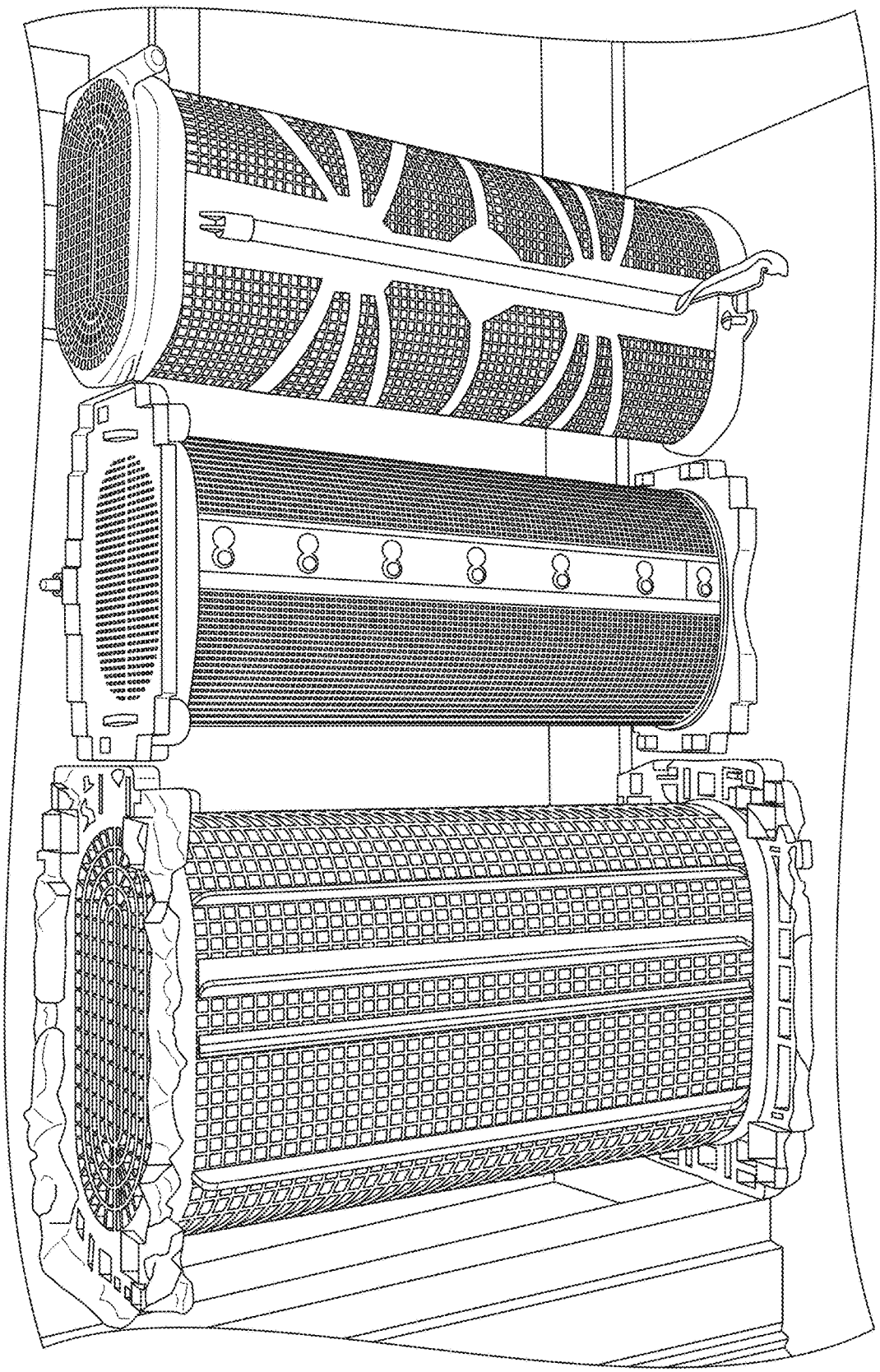
FIG. 1 is a photograph showing three different types of known shellfish baskets.
Figure 2:
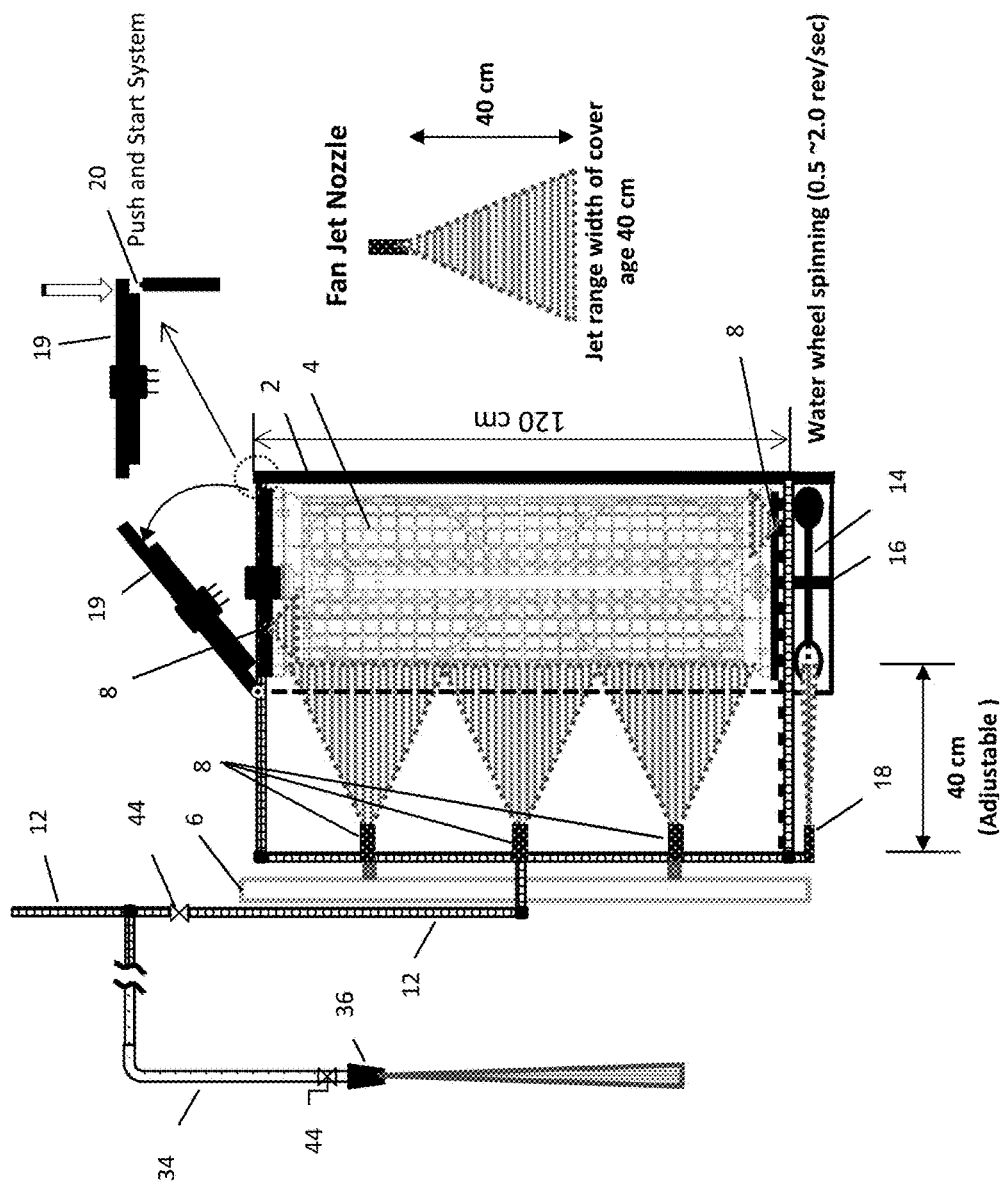
FIG. 2 is a side view schematic according to a first embodiment of the invention
Figure 3:
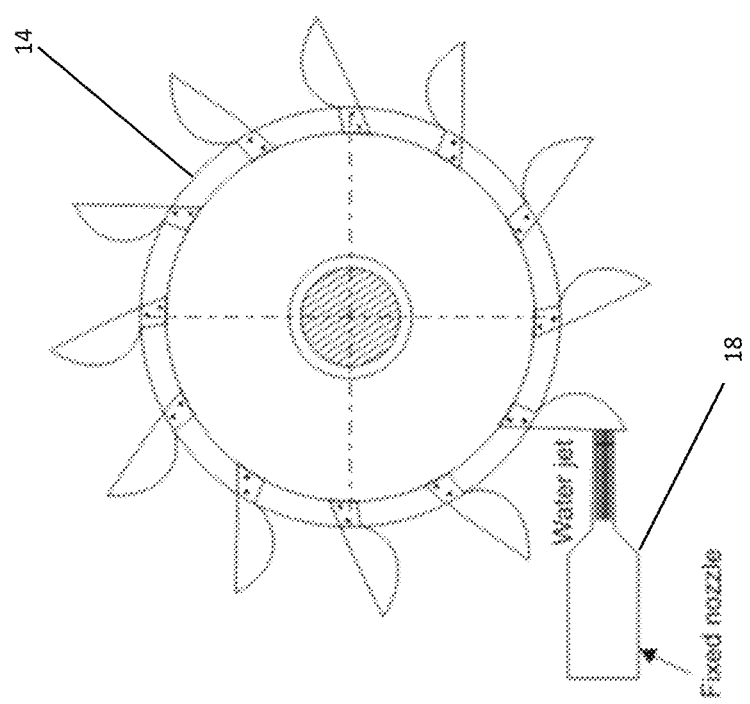
FIG. 3 is a top view of a schematic of the water wheel feature according to an embodiment of the invention.
Figure 4:
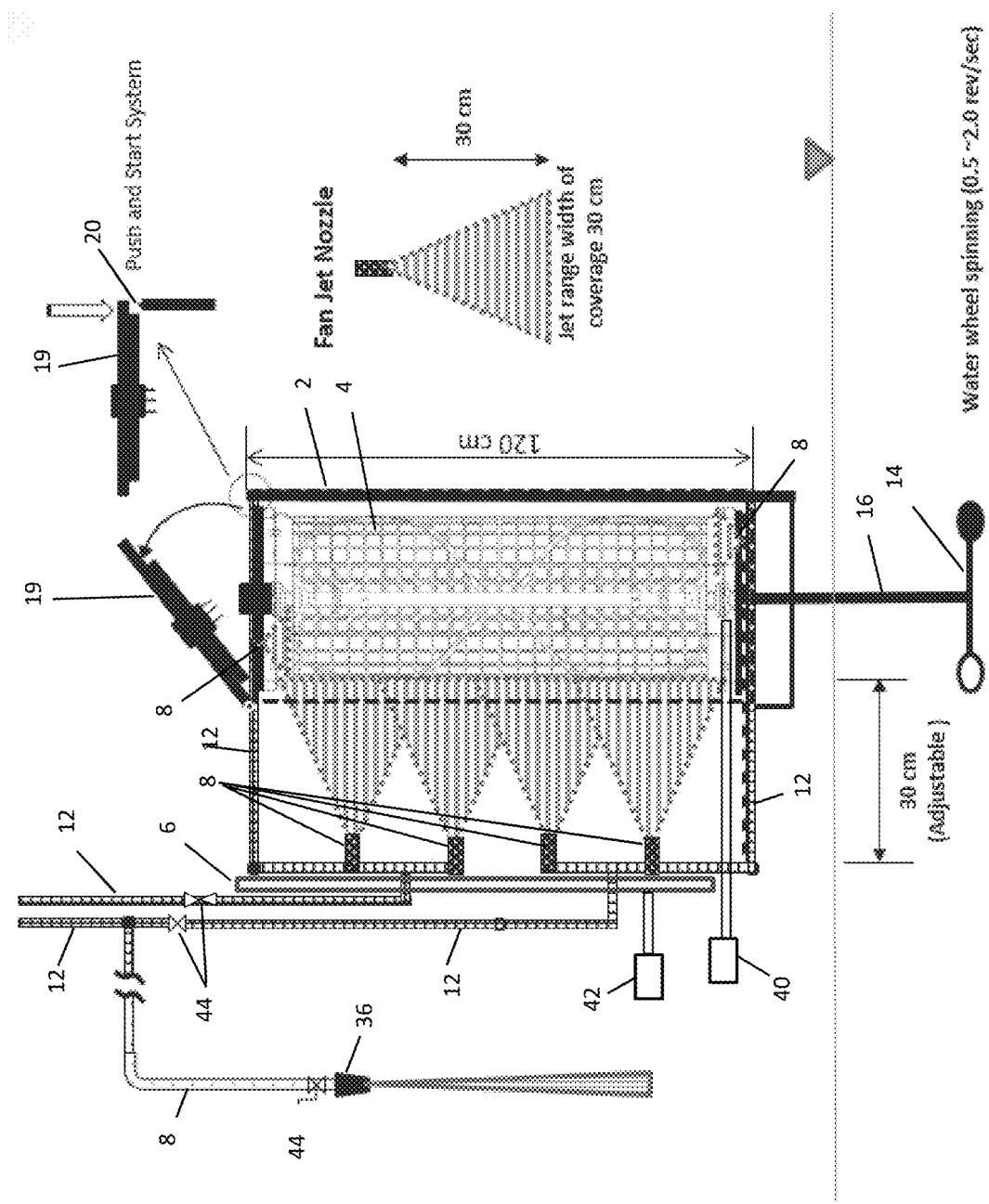
FIG. 4 is a side view schematic according to a second embodiment of the invention.
Figure 5:
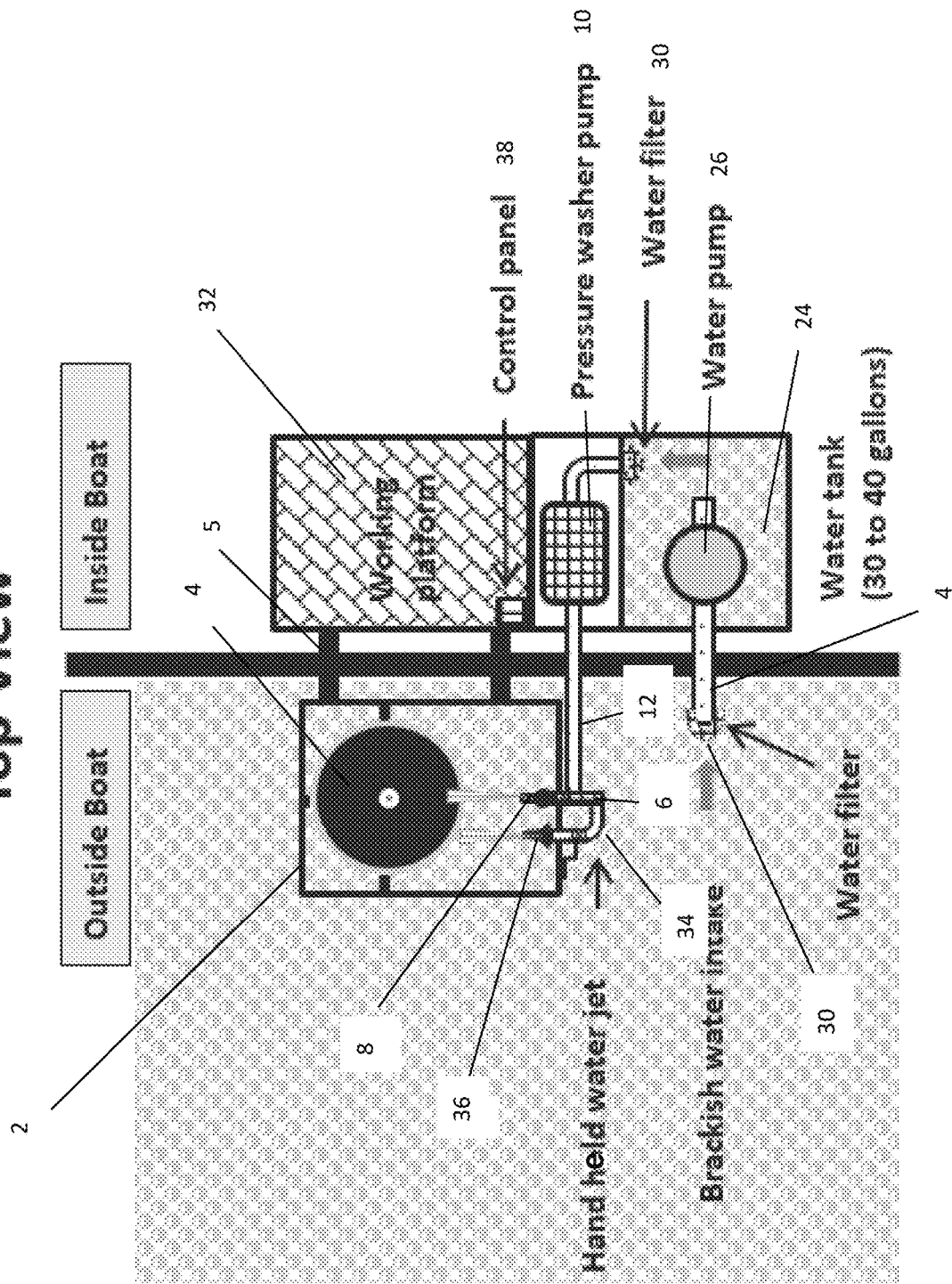
FIG. 5 is a top view schematic according to the embodiment of FIGS. 3 and 4, shown mounted on the side of a boat.
Figure 6:
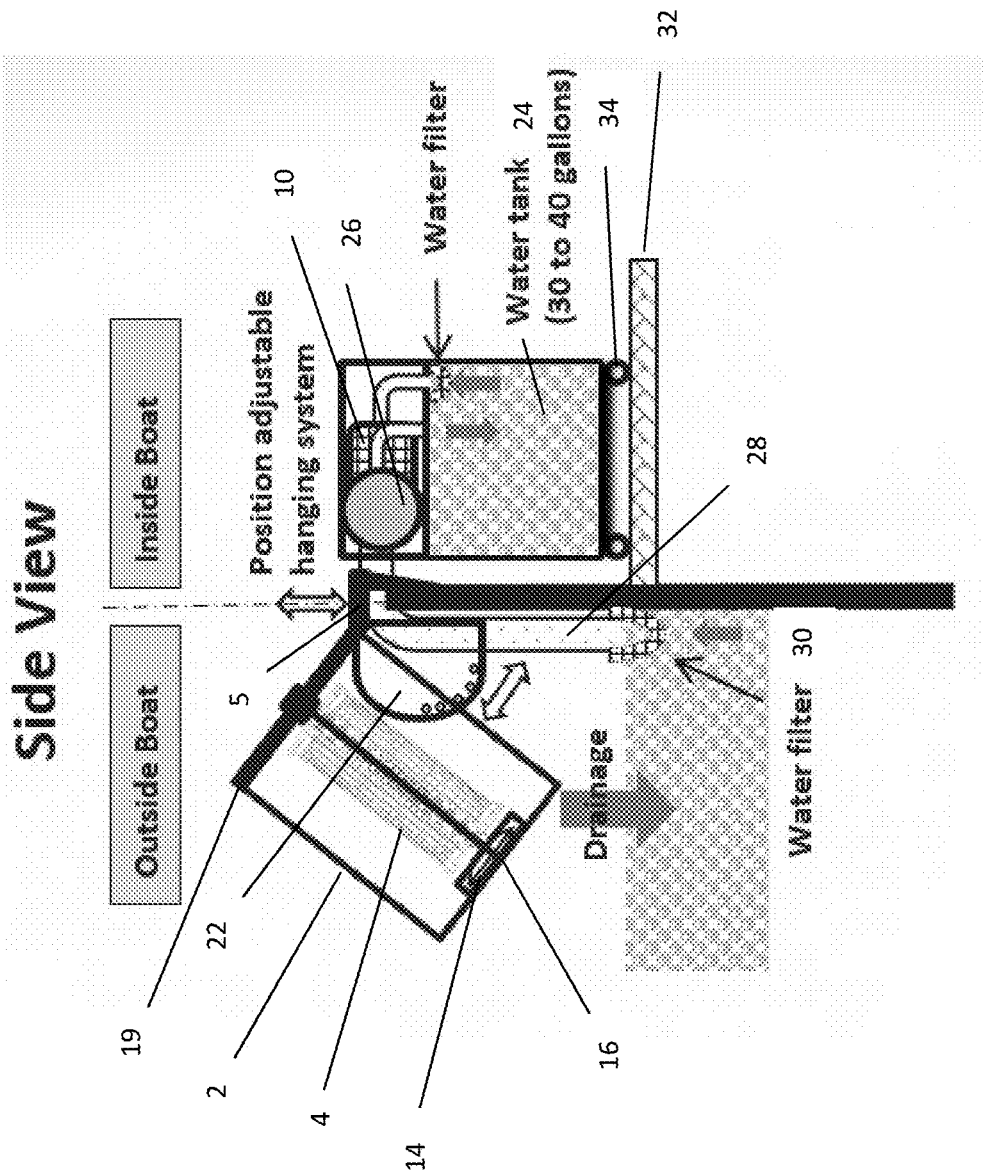
FIG. 6 is a side view schematic according to the embodiment of FIG. 3, shown mounted on the side of a boat.
Figure 7:
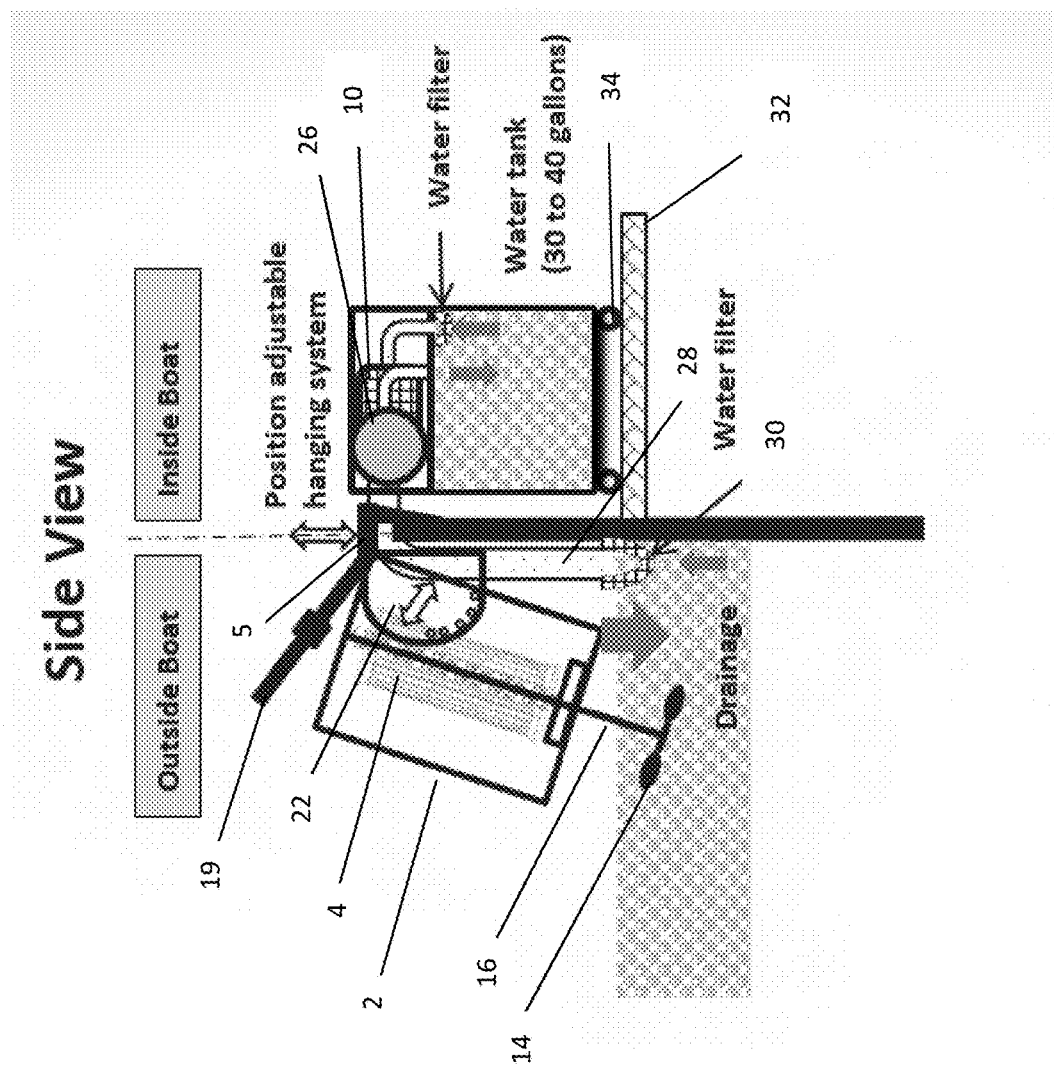
FIG. 7 is a side view schematic according to the embodiment of FIG. 4, shown mounted on the side of a boat.

Referring to the figures, portable basket washer includes an open basket holder 2 configured to rotatably support a shellfish basket 4 therein, an adjustable support assembly 5 for hanging the basket holder 2 over the side of a boat, or off the railing of a dock or other support structure, an assembly/array 6 of pressure washer nozzles 8 aimed at the shellfish basket 4 through the open sides, top, and bottom of the basket holder 2, and a pressure washer pump 10 for providing high pressure water to the pressure washer nozzles 8. High pressure water supply lines 12 connect the pressure water pump 10 to the pressure washer nozzles 8. The bottom of the basket holder 2 is preferably open to allow the washing water to drain directly from basket 4/basket holder 2. The pressure washer nozzles 8 may be fixed in position, or the angle at which they are aimed at the basket may be manually or automatically adjustable, individually or separately. According to one embodiment, a small basket holder drive motor 40 causes the basket 4 to rotate in the basket holder 2 as the high pressure spray is directed at the basket 4. According to another embodiment, a water wheel 14 is rotatably fixed in the basket holder 2, but fixedly attached to a rotatable support spindle 16, and a high pressure spray nozzle 18 is directed at the water wheel 14 to cause the wheel 14 and spindle 16 to turn, in turn causing the basket 4 to rotate within the basket holder 2 as other spray nozzles 8 are focused on the basket for cleaning. According to a preferred embodiment the high pressure spray nozzles 8 are focused at an angle to the basket in which the high pressure spray itself will cause the basket 4 to rotate in the basket holder 2 as it is being sprayed. According to an optional feature of this embodiment, the bottom support spindle 16 may extend down a distance from the bottom of the basket holder 2 sufficient to reach the body of water below, the spindle 16 having a water wheel 14 fixed at its distal end. In this fashion, while the high pressure spray nozzles 8 are causing the basket 4 to spin as it is being cleaned, the water wheel 14, submerged just below the surface of the body of water, acts as a brake to prevent the basket 4 from spinning too quickly. The speed/pressure of the high pressure spray applied to the basket may be controlled via electronically controlled valves 44 in the high pressure supply lines.

The water pressure in the high pressure supply lines 12 may be used to drive the nozzles 8 or nozzle assembly 6 up and down relative to the basket holder 2 to cover more area as the basket spins using one or more electronically controlled valves 44 in the high pressure supply lines 12 under control of the control panel 38. According to an alternative embodiment, the movement of the nozzle array may be driven by a nozzle assembly drive motor 42 or other power means.

The basket holder 2 is provided with lid 19, pivotally attached to the body of the basket holder 2, and a portion of the lid 19 is configured to interact with a button or sensor 20 in the closed position that will allow the system to operate and/or automatically cause the system to begin spraying depending on settings of control panel 38.

The basket holder 2 is pivotally attached to support assembly 5 allowing the bottom of the basket holder to be rotated away from the side of the boat/dock/other support. Support assembly 5 is fitted with one or more position plates 22 having a series of holes arranged along one edge to receive a bolt or other rod-type element (not shown) for fixing the basket holder 2 at one of several angles relative to the side of the boat/dock/other support. On-board water tank 24 supplies water to the pressure washer pump 10. Separate water pump 26 draws water from the body of water in which the boat sits, or adjacent to the dock on which the system is mounted via water intake tube 28 and water filter 30 to fill water tank 24. Working platform 32 is attached to support assembly 5 on an opposite side from said basket holder 2. Working platform 32 supports water tank 24, water pump 26 and pressure washer pump 10, leaving enough room free for an operator to also stand on the platform to operate the system of the invention. Castors 34 or other wheeled arrangement is attached to the bottom of the working platform 32 to facilitate transport.

Hand-held pressure washer wand 34 and nozzle 36 are attached to the high pressure water supply lines 12 for optional manual high pressure treatment of the baskets 4.

Control panel 38 is conveniently located on or adjacent the working platform and is hardwired or wirelessly connected to one or more of the pressure washer pump 10, the sensor 20, the water pump 26, basket holder drive motor 40, nozzle assembly drive motor 42, and one or more electronically controlled valves 44 in the high pressure water supply lines.

The invention claimed is:

1. A shellfish basket washing apparatus comprising:
a support assembly;
a shellfish basket holder configured to rotatably hold a shellfish basket therein; said shellfish basket holder pivotally attached to and configured to hang from a first side of said support assembly;
a nozzle support assembly also attached to said first side of said support assembly, said nozzle support assembly comprising a plurality of high pressure nozzles oriented to direct high pressure water into open sides of said shellfish basket holder;
a working platform attached to a second side of said support assembly;
a pressure washer pump supported on said working platform;
a water tank supported on said working platform and connected to said pressure washer pump by a water supply line;
a first high pressure water supply line connecting said pressure washer pump to said plurality of high pressure nozzles for supplying water under pressure to said high pressure nozzles;
wherein the apparatus is configured so that the support assembly may be supported on a side rail of a boat, with said shellfish basket holder hanging from said first side of said support assembly over a body of water in which the boat rests, and said working platform is hanging from a second side of said support assembly on an onboard side of said boat side rail or resting on a deck of said boat adjacent said boat side rail.

2. A shellfish basket washing apparatus according to claim 1, further comprising a handheld wand and nozzle assembly attached to said pressure washer pump by a second high pressure water line.

3. A shellfish basket washing apparatus according to claim 1, further comprising a water wheel attached to a bottom spindle of said shellfish basket holder.

4. A shellfish basket washing apparatus according to claim 3, further comprising a high pressure drive nozzle connected to said pressure washer pump and configured to direct water under pressure at said water wheel to drive rotation of a shellfish basket in said shellfish basket holder.

5. A shellfish basket washing apparatus according to claim 3, wherein said bottom spindle extends a length away from a bottom of said shellfish basket holder sufficient to be submerged or partially submerged in said body of water during a shellfish basket washing procedure.

6. A shellfish basket washing apparatus according to claim 1, wherein said high pressure nozzles are oriented to direct a water spray against a shellfish basket contained within said shellfish basket holder at an angle sufficient to cause said shellfish basket to rotate inside said shellfish basket holder.

7. A shellfish basket washing apparatus according to claim 1, further comprising top and bottom high pressure nozzles arranged to direct high pressure water spray to top and bottom sides of a shellfish basket contained in said shellfish basket holder and connected to said pressure wash pump by a third set of high pressure water supply lines.

8. A shellfish basket washing apparatus according to claim 1, further comprising a shellfish basket holder lid pivotally attached to said shellfish basket holder, said lid configured to reversibly contact an actuator.

9. A shellfish basket washing apparatus according to claim 8, wherein said actuator may be configured to accomplish at least one of the following:
a. automatically turn the apparatus on;
b. automatically start a spraying operation;
c. activate an indicator reflecting that the apparatus is ready for operation.

10. A shellfish basket washing apparatus according to claim 1, further comprising a water pump supported by said working platform configured to supply water to said water tank from said body of water.

11. A shellfish basket washing apparatus comprising:
a support frame having a first side portion, a second side portion, and a center portion interposed between said first side portion and said second side portion, said center portion configured to rest on and be supported by a side rail of a boat;
a shellfish basket holder pivotally attached to and suspended from said first side portion of said support frame;
a nozzle support assembly attached to said first side portion of said support frame, said nozzle support assembly comprising a plurality of high pressure nozzles oriented to direct high pressure water into open sides of said shellfish basket holder;
a working platform attached to and suspended from said second side portion of said support assembly;
a pressure washer pump supported on said working platform;
a water tank supported on said working platform and connected to said pressure washer pump by a water supply line;
a first high pressure water supply line connecting said pressure washer pump to said plurality of high pressure nozzles for supplying water under pressure to said high pressure nozzles;
wherein the apparatus is configured so that the support assembly may be supported on a side rail of a boat, with said shellfish basket holder hanging from said first side portion of said support frame over a body of water in which the boat rests, and said working platform is hanging from a second side portion of said support frame on an onboard side of said boat side rail or resting on a deck of said boat adjacent said boat side rail.

\* \* \* \* \*